UNITED STATES PATENT OFFICE.

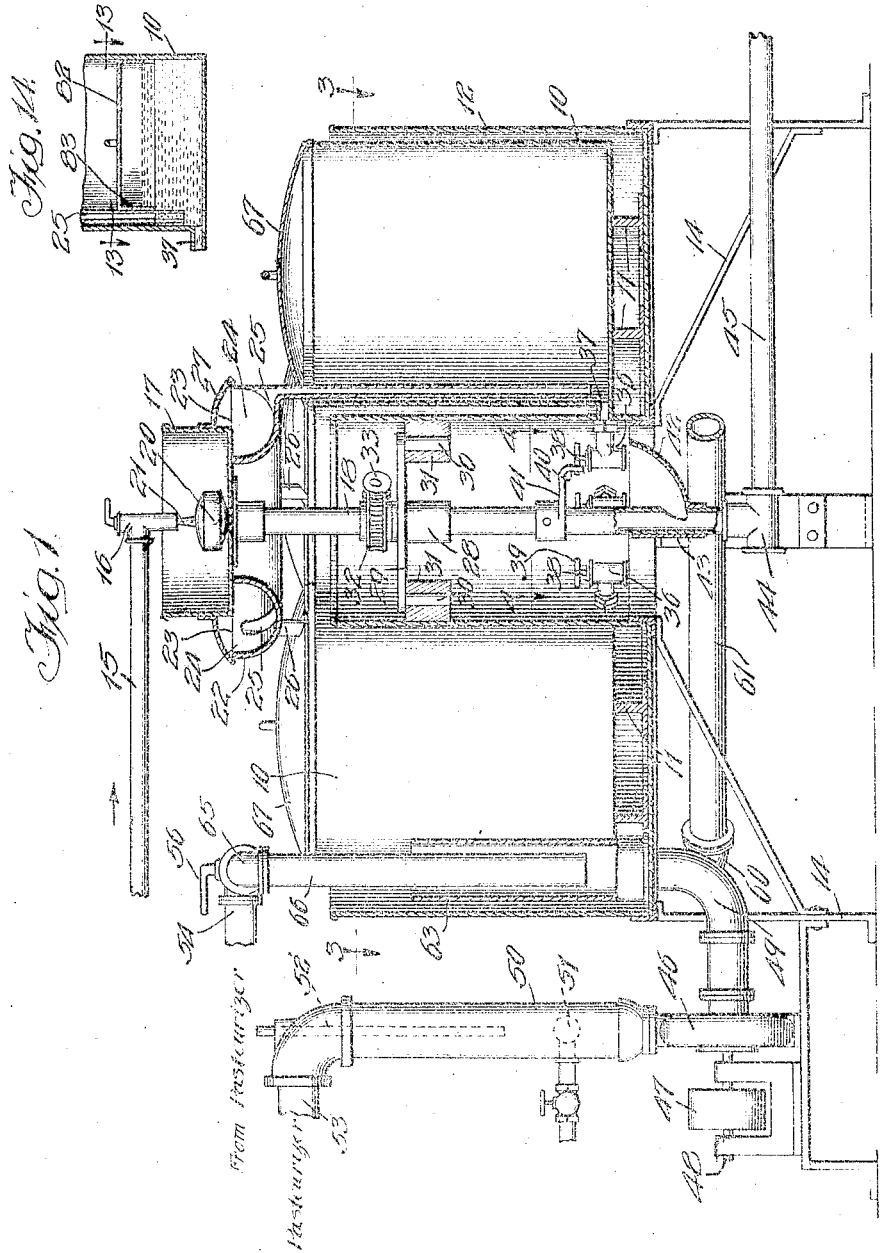

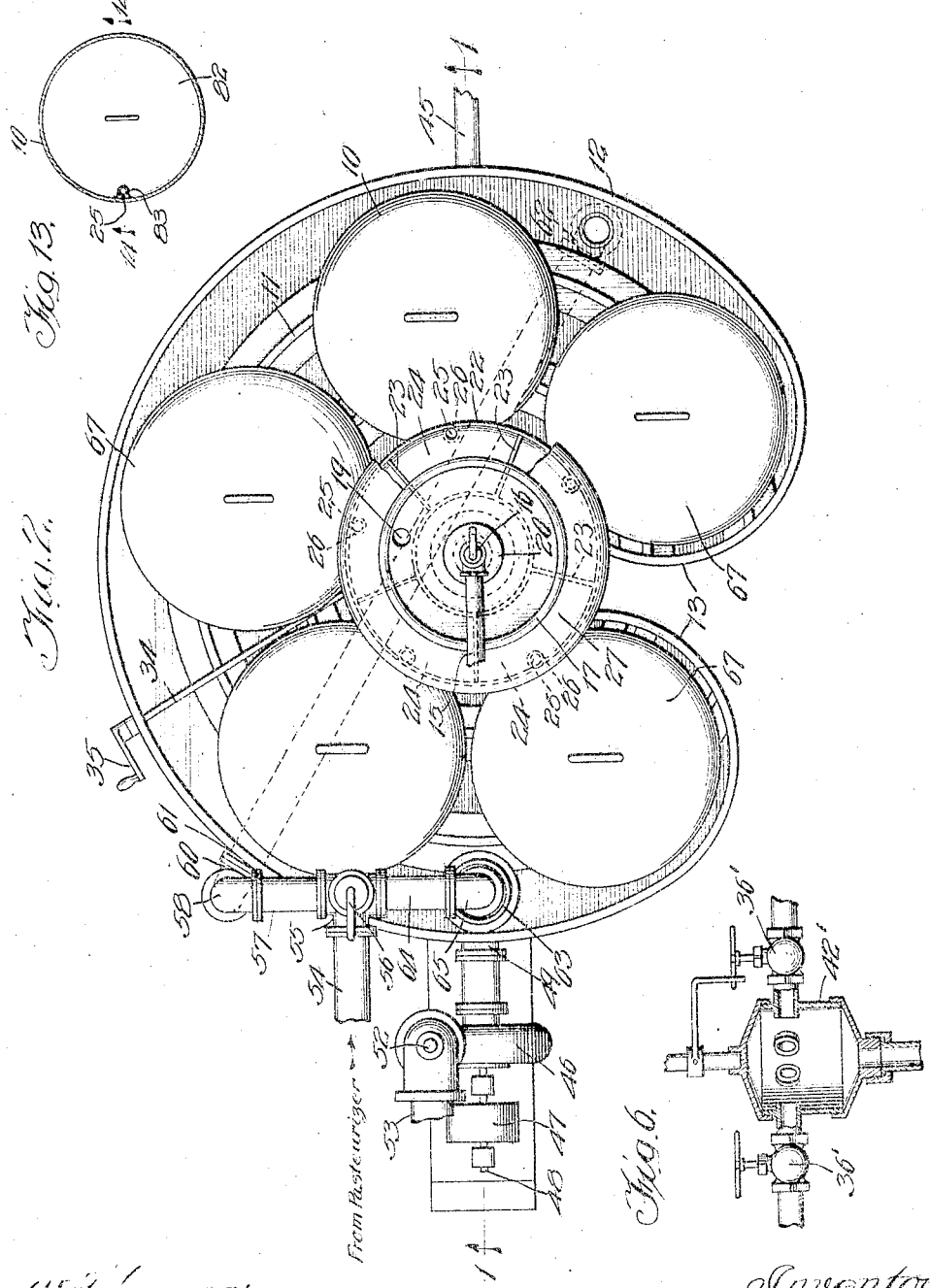

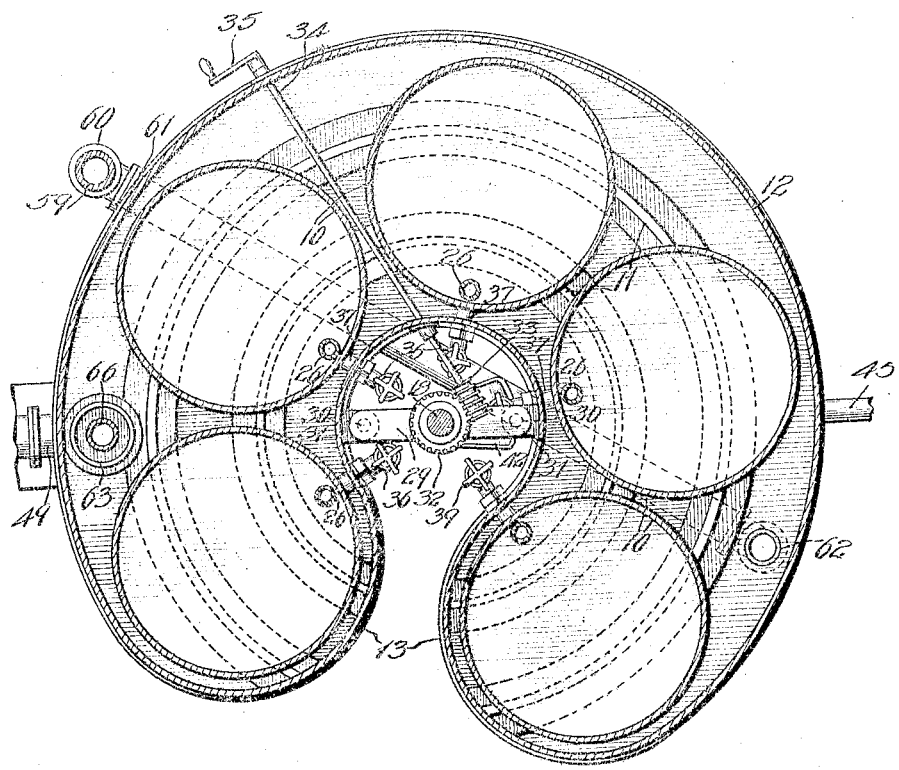
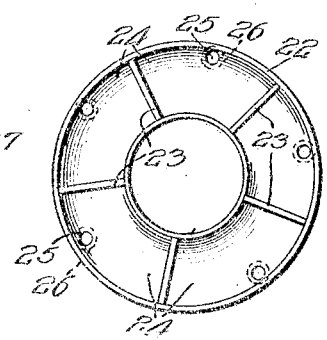
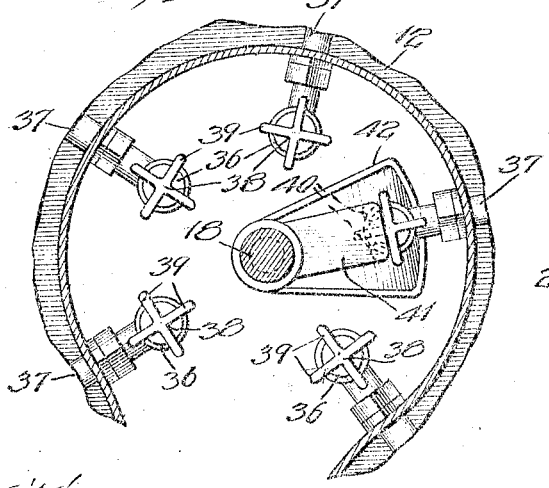

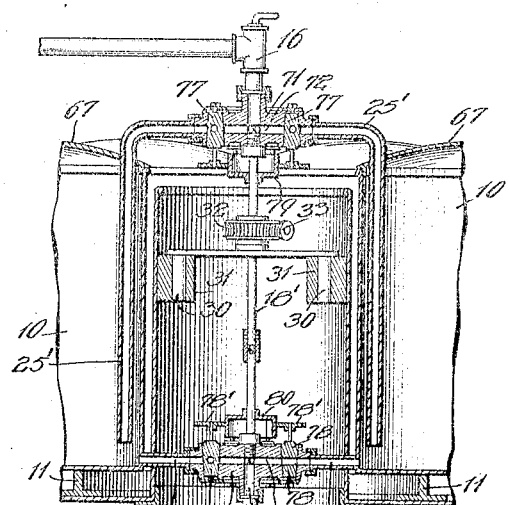
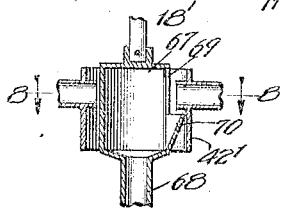
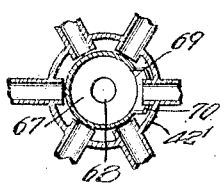
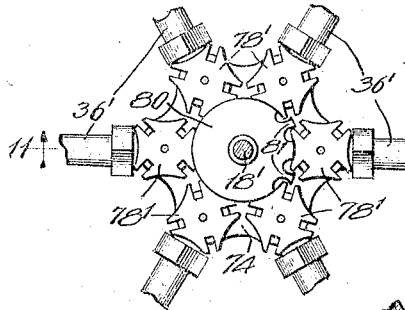
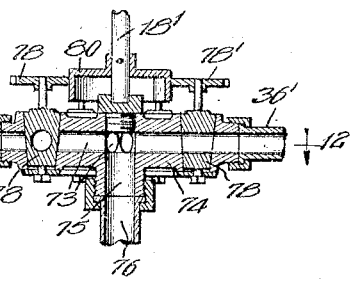
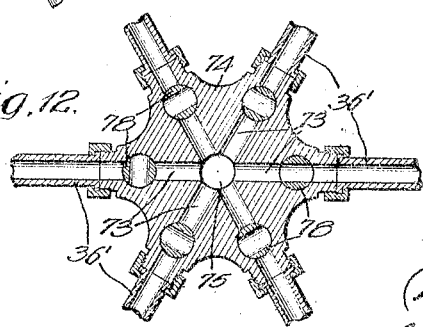

WILLIAM J. DAVIS, OF CHICAGO, ILLINOIS.

PASTEURIZING HOLDER.

1,406,982. Specification of Letters Patent. Patented Feb. 21, 1922.

Application filed April 21, 1919, Serial No. 291,682. Renewed October 11, 1920. Serial No. 416,292.

*To all whom it may concern:*

Be it known that I, WILLIAM J. DAVIS, a citizen of the United States, and a resident of Chicago, in the county of Cook and State of Illinois, have invented certain new and useful Improvements in Pasteurizing Holders, of which the following is a full, clear, and exact specification.

My invention is concerned with holders for pasteurizing systems, and is designed primarily to produce a simple structure of the class described in which there is no possibility of the milk which has been "held" from being contaminated by the milk just entering the holder, and consequently possibly containing live bacteria.

It is further concerned with a simple structure of the class described in which all the valve mechanism is readily accessible for cleaning and repairs.

Stated more specifically it is designed to produce a simple and cheaply manufactured construction wherein all the valve mechanism is concentrated in a single, easily accessible place, without the apparatus occupying an undue amount of space, and yet to employ such a valve mechanism as prevents the possibility of the held milk as it is being discharged from coming in contact with any of the unheld milk.

It is further designed to produce a simple plural vat structure of the class described in which all the vats can be readily placed in a single tank, and yet employ a simple valve mechanism concentrated at a single point so that it is readily accessible for cleaning and repairs.

To illustrate my invention, I annex hereto four sheets of drawings in which the same reference characters are used to designate identical parts in all the figures of which—

Fig. 1 is a central vertical section substantially on the line 1—1 of Fig. 2;

Fig. 2 is a top plan view of the same;

Fig. 3 is a plan view in horizontal section on the line 3—3 of Fig. 1;

Fig. 4 is a plan view on an enlarged scale as seen in section on the line 4—4 of Fig. 1;

Fig. 5 is a top plan view of the milk receiving funnels, uncovered;

Fig. 6 is a detail in central vertical section showing a modification of the discharge receptacle adapted for use where the milk must be discharged from the holder at a higher level;

Fig. 7 is a detailed view similar to Fig. 6, but showing a further modification;

Fig. 8 is a detail in section on the line 8—8 of Fig. 7;

Fig. 9 is a detail of the central portion of the apparatus as seen in Fig. 1, but showing a modified construction;

Fig. 10 is an enlarged plan view on the line 10—10 of Fig. 9, but showing a modified construction of the valves;

Fig. 11 is a section as seen on the line 11—11 of Fig. 10;

Fig. 12 is a section as seen on the line 12—12 of Fig. 11;

Fig. 13 is a plan view in section on the line 13—13 of Fig. 14; and

Fig. 14 is a vertical section on the line 14—14 of Fig. 13, showing a novel cover for the holding vats.

In carrying out my invention, the basis is a plurality of preferably cylindrical vats 10, which are grouped about a common center and supported by the curved T bars 11 a short distance above the bottom of a tank 12 which is generally annular in its horizontal cross section, except that two of the vats 10 are separated more widely than the others and the tank has the curved ends 13 which are separated widely enough so that the operator can pass between them to get at the center of the apparatus, where the valve mechanism is all located, for the purpose of cleaning and repairs. This tank is elevated a little way above the floor by suitable supporting framework or brackets 14.

The milk to be held comes from the pasteurizer through the pipe 15 which terminates in a cock 16 discharging at the center of the apparatus into a preferably circular receptacle 17 secured upon the upper end of a vertical shaft 18 and having a single eccentrically located outlet 19. To prevent an undue amount of milk accumulating in the receptacle 17, I preferably employ a float valve 20 with a tapering valve member 21 extending upwardly from the center thereof and into the outlet of the valve 16 so that when an excess of milk accumulates in the receptacle 17, the float 20 will be raised so that the valve 21 will close the outlet of the cock 16.

Associated with this receptacle 17 is an annular receptacle 22, concentric therewith and located partially beneath it, and divided by the partitions 23 into as many funnel compartments 24 as there are vats 10. Each of the compartments 24 has an outlet 25 opening preferably into the pipe 26 extending almost to the bottom of the vat so that milk will be emptied into the bottom rather than allowed to fall to the bottom from the top of the vat. To protect the receptacle 22 from any dirt that might otherwise fall into it, I secure upon the periphery of the receptacle 17 the annular and downwardly projecting flange 27, which, with the bottom of the receptacle 17, serves to cover all of the receptacle 22.

The shaft 18 is mounted in a suitable bearing 28 which is supported by a spider 29 for two or more arms with downwardly projecting pins 30 extending into the sockets 31 extending radially inward from the inner wall of the tank 12. A worm-gear 32 may be secured to the shaft above its bearing and the shaft be rotated by a worm 33 secured on the inner end of the shaft 34 mounted in suitable bearings in the wall of the tank 12 and driven as desired, in any suitable manner, as by the handle 35 or by the customary automatic mechanism which would be connected with the power plant in the customary manner. With the mechanism as thus far described, it will be obvious that if the shaft 18 is rotated at the proper speed, or rotated and stopped at the proper intervals, the vats 10 will be successively filled by the hot milk coming from the pasteurizer (not shown), through the pipe 15.

To empty the vats, after the milk has stood for the desired length of time, I employ the cocks 36, of which there will be one for each vat, connected with the bottom thereof by the short pipe 37 extending from said bottom and through the adjacent wall of the tank 12 by a water-tight joint so that there will be no leakage of the water from the tank 12. The cocks 36 are provided with the stems 38 which preferably have the four radially disposed fingers 39 which are adapted to be engaged by the downwardly projecting fingers 40 of the valve operating arm 41 secured on the shaft 18. In the normal operation of these cocks, the arm 41 swings past the cock and engages it to open it so that the contents of the vat are discharged, and then closes it so that it can be refilled and allowed to stand again for the desired length of time. The location of the aperture 19 relative to the arm 41 will be such that after a vat has been emptied, and the cock closed, the aperture 19 will be brought into register with the vat so as to fill it and allow it to remain filled until the arm 41 once more gets around to the opening position, which will occupy the necessary amount of time to properly pasteurize the milk at the temperature at which it is held.

The milk flowing from the cock 36 which happens to be open, empties into the generally funnel shaped receptacle 42, which is formed as a part of the sleeve 43 which is secured on the lower portion of the shaft 18 which is preferably made of a tube, and has its lower end rotating in the T 44 which is connected to the pipe 45 by which the pasteurized milk is led away to the coolers.

In the construction shown, the pipe 45 will deliver the milk at a lower level, but in case the apparatus is to be used in a system where the pasteurized milk has to be delivered at a higher level, instead of the open receptacle 42 shown in Fig. 1, I will employ the closed receptacle 42' shown in Fig. 6 in which the cocks 36' open into said receptacle so that it cannot overflow.

The hot water for circulating through the pasteurizer (not shown) and then jacketing the tank to prevent the temperature of the milk in the tank from falling, is furnished by the rotary pump 46, which may be driven by any suitable source of power as by a belt applied to the pulley 47 on the same shaft 48 as the propeller of the pump. The pump is supplied with water from the bottom of the tank 12 by the pipe 49, and it delivers the water to the pipe or receptacle 50, which is provided with a noiseless steam heater 51 to raise the temperature of the water as it passes through the pipe 50. A thermostat element 52 is located in the pipe and may be connected with suitable mechanism to regulate the valve controlling the heater 51 so that the water will always be delivered from the pipe 50 at the proper temperature. The water passes from the pipe 50 through the pipe 53 to the pasteurizer (not shown), and after it has flowed through the pasteurizer it returns through the pipe 54 preferably to the T 55 seen in Fig. 2, which is provided with a two-way valve 56, which, in one position, forces the hot water to pass to the left through the pipe 57, elbow 58, pipe 59 (see Fig. 3), elbow 60, pipe 61, running beneath the tank, to the elbow 62, which opens into the bottom of the tank at a point remote from the outlet elbow 49, so that the hot water in circulating through the tank will have time to deliver its heat to the water in the tank so that all the heat will be utilized. The level of the water in the tank is determined by the overflow pipe 63, which opens into the elbow or pipe 49, so as to secure a constant circulation of water through the tank. When the temperature is such that very little of the heat of the water returning from the pasteurizer is needed to keep up the temperature in the tank, the valve 56 is adjusted so as to pass the return water to the right through the pipe 64 connected by the elbow 65 with the pipe 66 extending down into the overflow pipe 63. When the valve 56 is thus adjusted, it will be obvious that the hot water circulated through the pasteurizer is short-circuited, as it were, in its passage through the holder tank and delivers but a small portion of its heat to the water in said tank.

In Figs. 7 and 8, I have illustrated a further modification of the valve mechanism which can be substituted for the valve mechanism shown in Fig. 6 when the holder is used in a gravity system, and in this modified construction the body of the casing 42' remains as before, but in place of the top and bottom pieces, I substitute an internal cylinder 67, which is closed at the top and has the adjacent end of the shaft 18' secured therein. Its bottom has connected therewith the tube 68, which will discharge into the T 44, in the same manner as shown in Fig. 1, and the cylinder 67 has an opening 69 in one side thereof and beneath it the flange 70, which has the function of the funnel-shaped member 42, seen in Fig. 1 as it is brought underneath the end of each of the valve discharge pipes as the cocks of the valves are opened.

In Figs. 9, 10, 11 and 12 I show still another modification in which the valve 16 is connected to a valve casing 71 having a number of passages 72 leading therefrom corresponding to the number of the vats 10, and each of these passages terminates in a pipe 25' extending down into the vats as before. At the bottom of each of the vats is the pipe 36' leading therefrom and connected to the passage 73 in the valve casing 74 of the same general character as the valve casing 71, except that it is inverted and has a discharge passage 75 leading therefrom to the pipe 76 opening into the T 44. Both of the valve casings 71 and 74 are provided with a plurality of valves 77 and 78 therein which open and close the passages 72 and 73 and each of the stems of these valves is provided with a four notched Geneva stop driven disk 78' and the shaft 18' which is journaled at its upper end in the under side of the valve casing 71 and at its lower end in the top of the valve casing 74 carries in the plane of these Geneva stop disks 78' a pair of Geneva stop driving sleeves 79 and 80, which sleeves have the pair of driving teeth 81 arranged as shown, so that at each rotation of the shaft 18', the sleeves 79 and 80 actuate the valves 77 and 78 twice, first opening them for a length of time sufficient to fill the tank or empty it, as the case may be, and then immediately thereafter closing or opening the same, as the case may be, so that the valves are opened and closed at regular intervals and are held locked between movements.

The vats 10 will be provided with the covers 67, and in so far as I have not described the construction and mode of operation of this device, it will be understood that it is constructed and operates in the usual manner.

Instead of the stationary covers 67, I preferably employ the movable covers 82, one of which is shown in Figs. 13 and 14, which covers have cylindrical sides and the open bottom, fitting somewhat snugly within the vats 10 and sliding up and down therein as they are filled and emptied. Where the pipes 25 are employed, a groove or recess 83 has to be placed in one side of the cover 82 to accommodate them. These covers have the advantage that only a small amount of air which might become contaminated with germs is permitted between the cover and the milk, and this same air is substantially retained throughout a run, so that it soon becomes sterilized from the continued heat to which it is subjected.

What I claim as new, and desire to secure by Letters Patent of the United States is—

1. In a device of the class described, the combination with a plurality of vats grouped about a common center, of a cock projecting horizontally and radially from the bottom of each vat toward said common center, a cock operating shaft extending vertically through said center, means for rotating the shaft, and a common receptacle into which all the cocks empty, two of said vats being separated so far that the operator can pass between them to reach the cocks.

2. In a device of the class described, the combination with a plurality of vats grouped about a common center, of a cock projecting from the bottom of each vat toward said common center, a cock operating shaft extending vertically through said center, means for rotating the shaft, and a common receptacle carried by said shaft and brought successively into register with the cocks.

3. In a device of the class described, the combination with a plurality of vats grouped about a common center, of a tank containing said vats, a cock projecting from the bottom of each vat through the inner wall of the tank toward said common center, a cock operating shaft extending vertically through said center, means for rotating the shaft, and a common receptacle into which all the cocks empty, two of the vats and the adjacent walls of the tank being separated so far that the operator can pass between them to reach the cocks.

4. In a device of the class described, the combination with a plurality of vats grouped about a common center, of a tank containing said vats, a cock projecting from the bottom of each vat through the inner wall of the tank toward said common center, a cock operating shaft extending vertically through said center, means for rotating the shaft, and a common receptacle carried by said shaft and brought successively into register with the cocks.

5. In a device of the class described, a plurality of vats grouped about a common center, two of them being more widely separated than the others, a tank generally annular in its horizontal cross section enclosing all of said tanks but having separated ends between said two vats so that the operator can pass between said ends to the open center of the tank, cocks projecting from the bottoms of said vats through the tank toward said center, a common receptacle into which all the cocks empty, and means for opening and closing said cocks.

6. In a device of the class described, a plurality of vats grouped about a common center, two of them being more widely separated than the others, a tank generally annular in its horizontal cross section enclosing all of said tanks but having separated ends between said two vats so that the operator can pass between said ends to the open center of the tank, cocks projecting from the bottoms of said vats through the tank toward said center, a common receptacle into which all the cocks empty, a vertical cock operating shaft in said center, and means for rotating said shaft.

7. In a device of the class described, a plurality of vats grouped about a common center, two of them being more widely separated than the others, a tank generally annular in its horizontal cross section enclosing all of said vats but having separated ends between said two vats so that the operator can pass between said ends to the open center of the tank, cocks projecting from the bottoms of said vats through the tank toward said center, a common receptacle into which all the cocks empty, and means for opening and closing said cocks.

8. In a device of the class described, the combination with a plurality of vats, of a tank surrounding said vats, means for filling and emptying said vats at intervals, a circulating system for a liquid adapted to fill said tank, an outlet from said tank at one side, an inlet at the opposite side, an auxiliary inlet adjacent the outlet, and valve mechanism to open either inlet and close the other.

9. In a device of the class described, the combination with a plurality of vats, of a tank surrounding said vats, means for filling and emptying said vats at intervals, a circulating system for a liquid adapted to fill said tank, an outlet comprising a vertical overflow pipe from said tank at one side, an inlet at the opposite side, an auxiliary inlet comprising a smaller pipe opening into the overflow pipe, and valve mechanism to open either inlet and close the other.

10. In an apparatus of the class described, the combination with a plurality of vats grouped about a common center, of a centrally located shaft, a receptacle for the incoming milk carried by the top of the shaft and having an eccentrically located discharge aperture, a receiving funnel for each of the vats with which the discharge aperture is adapted to register seriatim, and means for rotating the shaft.

11. In an apparatus of the class described, the combination with a plurality of vats grouped about a common center, of a centrally located shaft, a receptacle for the incoming milk carried by the top of the shaft and having an eccentrically located discharge aperture, a receiving funnel for each of the vats with which the discharge aperture is adapted to register seriatim, and means for rotating the shaft, each of said funnels having a pipe extending therefrom to the bottom of its associated vat.

12. In an apparatus of the class described, the combination with a plurality of vats grouped about a common center, of a centrally located shaft, a receptacle for the incoming milk carried by the top of the shaft and having an eccentric discharge aperture, a receiving funnel for each of the vats with which the discharge aperture is adapted to register seriatim, means for rotating the shaft, and an annular extension for said receptacle which extension overhangs and covers all of the receiving funnels.

13. In a holder, the combination with a vat, of means for filling and emptying the same at intervals, and a cover having a downwardly projecting flange adapted to fit in the vat and rise and fall with the liquid contents as it is filled and emptied.

14. In a holder, the combination with a vat, of means for filling and emptying the same at intervals, including a pipe extending downward therein to near the bottom thereof, and a cover having a downwardly projecting flange adapted to fit in the vat and rise and fall with the liquid contents as it is filled and emptied, said cover having a recess therein to accommodate the pipe.

15. A milk holding device comprising a plurality of vats grouped about a common axis, a substantially annular tank containing said vats, a common milk supply for said vats, a common discharge for said vats, and centrally located valve mechanism for controlling the milk flow with respect to said vats seriatim, two of the vats and the adjacent walls of said annular tank being separated so that the operator can pass between them to reach the valve mechanism.

16. A milk holding device comprising a plurality of vats grouped about a common axis, common means for supplying milk to said vats, common means for discharging the milk from said vats, valve mechanism for controlling the flow of milk with respect to said vats seriatim, a substantially annular tank containing said vats, and a circulating system for a liquid for filling said tank.

17. A milk holding device comprising a plurality of vats grouped about a common axis, common means for supplying milk to said vats, common means for discharging the milk from said vats, valve mechanism for controlling the flow of milk with respect to said vats seriatim, a substantially annular tank containing said vats, and a circulating system for a liquid for filling said tank, said valve mechanism being centrally located with respect to said vats.

18. A milk holding device comprising a plurality of vats, a tank containing said vats, means for filling and emptying said vats seriatim, means for causing liquid to flow through said tank around said vats, and means for short-circuiting the flow of said fluid so that it will not flow around said vats.

19. A milk treating apparatus comprising a holder, said holder comprising a plurality of vats and a tank containing said vats, said apparatus comprising a liquid circuit through said tank and around said vats, and means whereby said liquid can be short-circuited so as not to flow around said vats.

In witness whereof, I have hereunto set my hand and affixed my seal, this 15th day of April, A. D. 1919.

WILLIAM J. DAVIS. [L. S.]

Witness:
JOHN HOWARD McELROY.